United States Patent
Cholakkal et al.

(10) Patent No.: US 10,453,197 B1
(45) Date of Patent: Oct. 22, 2019

(54) OBJECT COUNTING AND INSTANCE SEGMENTATION USING NEURAL NETWORK ARCHITECTURES WITH IMAGE-LEVEL SUPERVISION

(71) Applicant: Inception Institute of Artificial Intelligence, Ltd., Abu Dhabi (AE)

(72) Inventors: Hisham Cholakkal, Abu Dhabi (AE); Guolei Sun, Abu Dhabi (AE); Fahad Shahbaz Khan, Abu Dhabi (AE); Ling Shao, Abu Dhabi (AE)

(73) Assignee: Inception Institute of Artificial Intelligence, Ltd., Al Maryah Island (AE)

(*) Notice: Subject to any disclaimer, the term of this patent is extended or adjusted under 35 U.S.C. 154(b) by 0 days.

(21) Appl. No.: 16/278,392

(22) Filed: Feb. 18, 2019

(51) Int. Cl.
*G06T 7/10* (2017.01)
*G06N 3/04* (2006.01)
*G06N 3/08* (2006.01)

(52) U.S. Cl.
CPC ............ *G06T 7/10* (2017.01); *G06N 3/0481* (2013.01); *G06N 3/084* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 2018/0204111 A1* | 7/2018 | Zadeh | G06N 3/0436 |
| 2018/0253629 A1* | 9/2018 | Bamba | G06K 9/2054 |
| 2018/0285862 A1 | 10/2018 | Dayalan | |
| 2019/0057507 A1* | 2/2019 | El-Khamy | G06T 7/11 |

OTHER PUBLICATIONS

Vishwanath A. Sindagi and Vishal M. Patel, "Generating High-Quality Crowd Density Maps using Contextual Pyramid CNNs", arXiv:1708.00953v1 [cs.CV] Aug. 2, 2017.*
Di Kang, Zheng Ma, "Beyond Counting: Comparisons of Density Maps for Crowd Analysis Tasks—Counting, Detection, and Tracking", arXiv:1705.10118v2 [cs.CV] Jun. 13, 2018.*
Z. Ma, Lei Yu and A. B. Chan, "Small instance detection by integer programming on object density maps," 2015 IEEE Conference on Computer Vision and Pattern Recognition (CVPR), Boston, MA, 2015, pp. 3689-3697. doi: 10.1109/CVPR.2015.7298992.*

(Continued)

*Primary Examiner* — Jiangeng Sun
(74) *Attorney, Agent, or Firm* — Bryan Cave Leighton Paisner LLP (57) ABSTRACT

This disclosure relates to improved techniques for performing computer vision functions including common object counting and instance segmentation. The techniques described herein utilize a neural network architecture to perform these functions. The neural network architecture can be trained using image-level supervision techniques that utilize a loss function to jointly train an image classification branch and a density branch of the neural network architecture. The neural network architecture constructs per-category density maps that can be used to generate analysis information comprising global object counts and locations of objects in images.

21 Claims, 6 Drawing Sheets
(3 of 6 Drawing Sheet(s) Filed in Color)

(56) References Cited

OTHER PUBLICATIONS

X. Zhao, S. Liang and Y. Wei, "Pseudo Mask Augmented Object Detection," 2018 IEEE/CVF Conference on Computer Vision and Pattern Recognition, Salt Lake City, UT, 2018, pp. 4061-4070. doi: 10.1109/CVPR.2018.00427.*
A. Bearman, O. Russakovsky, V. Ferrari, and L. Fei-Fei. Whats the point: Semantic segmentation with point supervision. In ECCV, 2016.
Y. Zhu, Y. Zhou, Q. Ye, Q. Qiu, and J. Jiao. Soft proposal networks for weakly supervised object localization. In ICCV, 2017.
X. Cao, Z. Wang, Y. Zhao, and F. Su. Scale aggregation network for accurate and efficient crowd counting. In ECCV, 2018.
P. Chattopadhyay, R. Vedantam, R. R. Selvaraju, D. Batra, and D. Parikh. Counting everyday objects in everyday scenes. In CVPR, 2017.
Chhavi. k largest (or smallest) elements in an array—added min heap method, 2018.
D. H. Clements. Subitizing: What is it? why teach it? Teaching children mathematics, 5, 1999.
M. Everingham, S. A. Eslami, L. Van Gool, C. K. Williams, J. Winn, and A. Zisserman. The pascal visual object classes challenge: A retrospective. IJCV, 111(1), 2015.
M. Gao, A. Li, R. Yu, V. L Morariu, and L. S. Davis. C-wsl: Count-guided weakly supervised localization. In ECCV, 2018.
R. Girshick. Fast r-cnn. In ICCV, 2015.
R. Guerrero, B. Torre, R. Lopez, S. Maldonado, and D. Onoro. Extremely overlapping vehicle counting. In IbPRIA, 2015.
K. He, X. Zhang, S. Ren, and J. Sun. Deep residual learning for image recognition. In CVPR, 2016.
B. R. Jansen, A. D. Hofman, M. Straatemeier, B. M. van Bers, M. E. Raijmakers, and H. L. van der Maas. The role of pattern recognition in children's exact enumeration of small numbers. British Journal of Developmental Psychology, 32 (2), 2014.
M. Lapin, M. Hein, and B. Schiele. Analysis and optimiza-tion of loss functions for multiclass, top-k, and multilabel classification. TPAMI, 40(7), 2018.
I. H. Laradji, N. Rostamzadeh, P. O. Pinheiro, D. Vazquez, and M. Schmidt. Where are the blobs: Counting by localization with point supervision. In ECCV, 2018.
V. Lempitsky and A. Zisserman. Learning to count objects in images. In NIPS. 2010. 3.
Y. Li, X. Zhang, and D. Chen. Csrnet: Dilated convolutional neural networks for understanding the highly congested scenes. In CVPR, 2018.
T.-Y. Lin, M. Maire, S. Belongie, J. Hays, P. Perona, D. Ramanan, P. Dollár, and C. L. Zitnick. Microsoft coco: Common objects in context. In ECCV. Springer, 2014.
X. Liu, J. van de Weijer, and A. D. Bagdanov. Leveraging unlabeled data for crowd counting by learning to rank. In CVPR, 2018.
J. Long, E. Shelhamer, and T. Darrell. Fully convolutional networks for semantic segmentation. In CVPR, 2015.
G. Mandler and B. J. Shebo. Subitizing: an analysis of its component processes. Journal of Experimental Psychology: General, 111(1), 1982.
M. Mark, M. Kevin, L. Suzanne, and O. NoelE. Fully convolutional crowd counting on highly congested scenes. In ICCV, 2017.
M. Oquab, L. Bottou, I. Laptev, and J. Sivic. Is object localization for free?-weakly-supervised learning with convolutional neural networks. In CVPR, 2015.
A. Paszke, S. Gross, S. Chintala, G. Chanan, E. Yang, Z. De-Vito, Z. Lin, A. Desmaison, L. Antiga, and A. Lerer. Automatic differentiation in pytorch. In NIPS-W, 2017.
J. Pont-Tuset, P. Arbelaez, J. T. Barron, F. Marques, and J. Malik. Multiscale combinatorial grouping for image segmentation and object proposal generation. TPAMI, 39(1), 2017.
J. Pont-Tuset and L. Van Gool. Boosting object proposals: From pascal to coco. In ICCV, 2015.
F. Wan, P. Wei, J. Jiao, Z. Han, and Q. Ye. Min-entropy latent model for weakly supervised object detection. In CVPR, 2018.
J. Wang, Y. Song, T. Leung, C. Rosenberg, J. Wang, J. Philbin, B. Chen, and Y. Wu. Learning fine-grained image similarity with deep ranking. In CVPR, 2014.
K. Wu, E. Otoo, and A. Shoshani. Optimizing connected component labeling algorithms. In Medical Imaging 2005: Image Processing, vol. 5747. International Society for Optics and Photonics, 2005.
J. Zhang, S. Ma, M. Sameki, S. Sclaroff, M. Betke, Z. Lin, X. Shen, B. Price, and R. Mech. Salient object subitizing. In CVPR, 2015.
Y. Zhang, D. Zhou, S. Chen, S. Gao, and Y. Ma. Single-image crowd counting via multi-column convolutional neural network. In CVPR, 2016.
B. Zhou, A. Khosla, A. Lapedriza, A. Oliva, and A. Torralba. Learning deep features for discriminative localization. In CVPR, 2016.
Y. Zhou, Y. Zhu, Q. Ye, Q. Qiu, and J. Jiao. Weakly supervised instance segmentation using class peak response. In CVPR, 2018.
Pinheiro, et al. "From image-level to pixel-level labeling with convolutional networks," Proceedings of the IEEE Conference on Computer Vision and Pattern Recognition, 2015.

* cited by examiner

OBJECT COUNTING AND INSTANCE SEGMENTATION USING NEURAL NETWORK ARCHITECTURES WITH IMAGE-LEVEL SUPERVISION

TECHNICAL FIELD

This disclosure is related to improved techniques for performing computer vision functions and, more particularly, to techniques that utilize trained neural networks and artificial intelligence (AI) algorithms to perform object counting, instance segmentation, and other computer vision functions.

BACKGROUND

Common object counting, also referred to as generic object counting, generally refers to computer vision functions associated with accurately predicting the number of different object category instances present in an image. Instance segmentation generally refers to computer vision functions associated with identifying locations of objects in an image with pixel-level accuracy. Both functions are especially difficult to perform in images involving natural scenes, which can comprise both indoor and outdoor scenes, and which can include objects in a very wide range of object categories (e.g., people, animals, plants, food, furniture, appliances, etc.) that have large intra-class variations.

To accurately perform object counting and instance segmentation, computer vision applications must account for a variety of technical problems. For example, one technical problem relates to counting objects in images in which large portions of the objects are hidden or heavily occluded. These occlusions may result from, inter alia, certain objects blocking views of other objects, portions of the objects being located on the periphery of images (thus, being partially cut out of the image), poor lighting conditions, background clutter, and/or objects being located far distances from the camera that captured the images. Other key challenges relate to accurately counting objects included in categories with large intra-class variations (e.g., such that a single class includes objects that vary greatly) and/or across diverse object categories (e.g., in situations where there are very large numbers of candidate object categories and the categories can vary greatly). The task of counting or classifying the objects in these scenarios can be extremely challenging. Additional challenges involve handling the co-existence of multiple instances of different objects in a single scene, and accounting for sparsity issues that result from many objects having a zero count across multiple images.

BRIEF DESCRIPTION OF DRAWINGS

The patent or application file contains at least one drawing executed in color. Copies of this patent or patent application publication with color drawing(s) will be provided by the Office upon request and payment of the necessary fee.

To facilitate further description of the embodiments, the following drawings are provided, in which like references are intended to refer to like or corresponding parts, and in which.

DETAILED DESCRIPTION OF EXEMPLARY EMBODIMENTS

The present disclosure relates to systems, methods, and apparatuses that provide improved techniques for performing computer vision functions including, but not limited to, object counting and instance segmentation. A computer vision system includes a neural network architecture that is trained to perform these and other functions. In certain embodiments, the neural network architecture may be trained using image-level supervision techniques, which eliminate the need for user-intensive annotations that are typically required by instance-level supervision techniques (e.g., which typically require point-level annotations or bounding boxes to be utilized to identify objects during training). During training, the image-level supervision techniques is trained using a novel loss function, which includes parameters for predicting the global count and spatial distribution of objects, to construct per-category density maps. The image-level supervised computer vision system utilizes the learned parameters to construct density maps that accurately determine object counts and identify object locations with pixel-level accuracy.

The image-level supervision techniques that are utilized to train the neural network architecture of the computer vision system can vary. In certain embodiments, image-level supervision is performed using training images that only include annotations indicating counts of different object instances in images without any other annotations (e.g., without annotations identifying the locations of the objects).

Certain embodiments can apply additional techniques to further reduce the amount of supervision performed based on a "subitizing range" principle. Psychological studies have suggested that humans are capable of counting objects non-sequentially using holistic cues for fewer object counts, which is termed as a subitizing range (e.g., within a range of 1-4). This concept can be applied to reduce the burden associated with annotating the training data that is used to train the neural network architecture. For example, in certain embodiments, the image-level supervision techniques only utilize ground-truth count annotations in a given image for object categories that are within the pre-determined subitizing range, and do not require ground-truth count annotations for object categories that exceed the pre-determined subitizing range. Despite being trained with such reduced ground-truth count annotations, the neural architecture is able to accurately count objects, classify objects, and identify locations of objects beyond the subitizing range and under heavy occlusion. This concept of using reduced ground-truth count annotations for object categories within the subitizing range during the image-level supervised training procedure is generally referred to herein as image-level lower-count (ILC) supervision, and is discussed in further detail below.

In certain embodiments, the neural network architecture of the computer vision system may be constructed, at least in part, upon a pre-trained neural network, such as an ImageNet pre-trained network backbone (e.g., ResNet50) that is connected to two output branches: an image classification branch and a density branch. Generally speaking, the image classification branch can be configured to estimate the presence or absence of objects in an image, and the density branch can be configured to predict the global object count and the spatial distribution of object instances using the density maps. During training, the loss function jointly optimizes both branches to accurately predict object locations and global object counts in the density maps generated from images.

The technologies discussed herein can be used in a variety of different contexts and environments. One useful application of these technologies is in the context of computer vision, which can be applied across a wide variety of different applications. For example, the technologies disclosed herein may be integrated into any application, device, or system that can benefit from object counting, classification, and/or segmentation. Another useful application of these technologies is in the context of surveillance systems. For example, integrating these technologies into a surveillance system or application would permit the surveillance system to quickly determine the number and locations of individuals or objects (e.g., weapons or bags) that are present in an image. Another useful application of these technologies is in the context of automated vehicles. For example, the technologies disclosed herein can be integrated into land-based vehicles (e.g., cars, trucks, etc.), water-based vehicles (e.g., boats, ships, submersibles, etc.), and/or air-based vehicles (e.g., drones, airplanes, aircrafts, etc.) that rely on automated systems to control the vehicles. The technologies could be used to identify the presence and locations of other nearby vehicles, obstacles, and objects to assist these automated systems with safely controlling the automated vehicles. Another useful application of these technologies is in the image editing applications. For example, the technologies disclosed herein can assist image editing applications with accurately identifying and editing objects in images. The technologies discussed herein can also be applied to many other contexts as well.

As evidenced by the disclosure herein, the inventive techniques set forth in this disclosure are rooted in computer technologies that overcome existing problems in known computer vision systems, specifically problems dealing with object counting, classification, and segmentation. The techniques described in this disclosure provide a technical solution (e.g., one that utilizes various AI-based neural networking and machine learning techniques) for overcoming the limitations associated with known techniques. For example, the image analysis techniques described herein take advantage of novel AI and machine learning techniques to learn functions for automating object counting, classification, and segmentation. Moreover, in certain embodiments, these functions can be learned using an image-level supervision technique that reduces the training burden on the system and eliminates the need for instance-level supervision, which typically requires user-intensive annotations on the images and corresponding objects. This technology-based solution marks an improvement over existing capabilities and functionalities related to computer vision systems by improving the accuracy of the computer vision functions and reducing the information that is required to train the neural network architectures to perform such functions.

In certain embodiments, a system is provided for performing computer vision functions. The system includes one or more computing devices comprising one or more processors and one or more non-transitory storage devices for storing instructions, wherein execution of the instructions by the one or more processors causes the one or more computing devices to: train a neural network architecture with a loss function to perform object counting and instance segmentation using an image-level supervised training procedure that utilizes training images annotated with ground-truth object count information to train the neural network architecture to generate one or more density maps corresponding to one or more object categories; receive, at the trained neural network architecture, an image comprising one or more objects; generate, using the trained neural network architecture, a density map corresponding to the image; and perform object counting and instance segmentation on the image, at least in part, using the density map generated by the trained neural network architecture.

In certain embodiments, a method is provided for performing computer vision functions. The method comprises: training a neural network architecture with a loss function to perform object counting and instance segmentation using an image-level supervised training procedure that utilizes training images annotated with ground-truth object count information to train the neural network architecture to generate one or more density maps corresponding to one or more object categories; receiving, at the trained neural network architecture, an image comprising one or more objects; generating, using the trained neural network architecture, a density map corresponding to the image; and performing object counting and instance segmentation on the image, at least in part, using the density map generated by the trained neural network architecture.

In certain embodiments, a computer program product is provided for performing computer vision functions. The computer program product comprises a non-transitory computer-readable medium including instructions for causing a computer to: train a neural network architecture with a loss function to perform object counting and instance segmentation using an image-level supervised training procedure that utilizes training images annotated with ground-truth object count information to train the neural network architecture to generate one or more density maps corresponding to one or more object categories; receive, at the trained neural network architecture, an image comprising one or more objects; generate, using the trained neural network architecture, a density map corresponding to the image; and perform object counting and instance segmentation on the image, at least in part, using the density map generated by the trained neural network architecture.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature or component that is described in the present application may be implemented in hardware and/or software.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Figure 1:
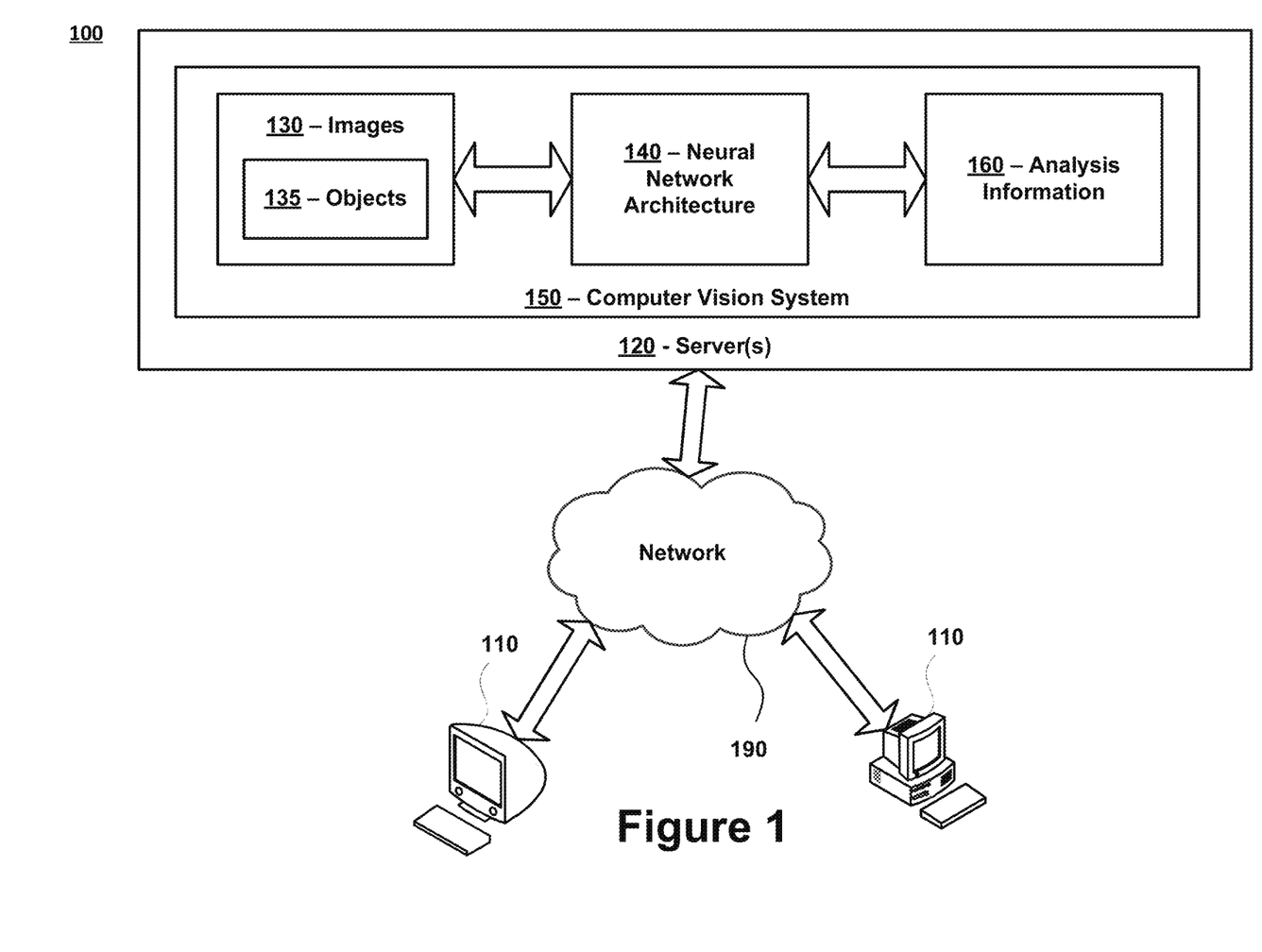
FIG. 1 is a diagram of an exemplary system for generating images in accordance with certain embodiments.

FIG. 1 is a diagram of an exemplary system 100 in accordance with certain embodiments. The system 100 comprises one or more computing devices 110 and one or more servers 120 that are in communication over a network 190. A computer vision system 150 is stored on, and executed by, the one or more servers 120. The network 190 may represent any type of communication network, e.g., such as one that comprises a local area network (e.g., a Wi-Fi network), a personal area network (e.g., a Bluetooth network), a wide area network, an intranet, the Internet, a cellular network, a television network, and/or other types of networks.

All the components illustrated in FIG. 1, including the computing devices 110, servers 120, and computer vision system 150 can be configured to communicate directly with each other and/or over the network 190 via wired or wireless communication links, or a combination of the two. Each of the computing devices 110, servers 120, and computer vision system 150 can also be equipped with one or more transceiver devices, one or more computer storage devices (e.g., RAM, ROM, PROM, SRAM, etc.), and one or more processing devices (e.g., central processing units) that are capable of executing computer program instructions. The computer storage devices can be physical, non-transitory mediums.

In certain embodiments, the computing devices 110 may represent desktop computers, laptop computers, mobile devices (e.g., smart phones, personal digital assistants, tablet devices, vehicular computing devices, or any other device that is mobile in nature), and/or other types of devices. The one or more servers 120 may generally represent any type of computing device, including any of the computing devices 110 mentioned above. In certain embodiments, the one or more servers 120 comprise one or more mainframe computing devices that execute web servers for communicating with the computing devices 110 and other devices over the network 190 (e.g., over the Internet).

In certain embodiments, the computer vision system 150 is stored on, and executed by, the one or more servers 120. The computer vision system 150 can be configured to perform any and all operations associated with analyzing images 130 and/or executing computer vision functions including, but not limited to, functions for performing common object counting (also referred to herein as generic object counting), object classification, and instance segmentation (e.g., which may include identifying locations of objects 135 in the images 130).

The images 130 provided to, and analyzed by, the computer vision system 150 can include any type of image. In certain embodiments, the images 130 can include one or more two-dimensional (2D) images. In certain embodiments, the images 130 may include one or more three-dimensional (3D) images. The images 130 may be captured in any digital or analog format, and using any color space or color model. Exemplary image formats can include, but are not limited to, JPEG (Joint Photographic Experts Group), TIFF (Tagged Image File Format), GIF (Graphics Interchange Format), PNG (Portable Network Graphics), etc. Exemplary color spaces or models can include, but are not limited to, sRGB (standard Red-Green-Blue), Adobe RGB, gray-scale, etc.

The images 130 received by the computer vision system 150 can be captured by any type of camera device. The camera devices can include any devices that include an imaging sensor, camera or optical device. For example, the camera devices may represent still image cameras, video cameras, and/or other devices that include image/video sensors. The camera devices can also devices that include imaging sensors, cameras or optical devices and which are capable of performing other functions unrelated to capturing images. For example, the camera devices can include mobile devices (e.g., smart phones or cell phones), tablet devices, computing devices, desktop computers, etc. The camera devices can be equipped with analog-to-digital (A/D) converters and/or digital-to-analog (D/A) converters based on the configuration or design of the camera devices. In certain embodiments, the computing devices 110 shown in FIG. 1 can include any of the aforementioned camera devices, or other types of camera devices.

The images 130 provided to the computer vision system 150 can correspond to any type of scene. In certain embodiments, some or all of the images 130 provided to the computer vision system 150 can include images 130 that depict natural scenes and/or surveillance scenes. These scenes may represent any indoor and/or outdoor environment. Examples of such scenes for indoor environments can include rooms or locations included inside of enclosed structures (e.g., houses, restaurants, offices, manufacturing plants, residential buildings, commercial buildings, industrial buildings, garages, sheds, etc.). Examples of outdoor scenes can include any locations or environments that are outside of an enclosed structure (e.g., parks, streets, landmarks, yards, playgrounds, beaches, forests, etc.). The images 130 can also correspond to "non-natural scenes." Examples of non-natural scenes may include images 130 that have been altered (e.g., using image editing software) or scenes that have been staged (e.g., to display an object or person in front of a background with having a particular color).

One of ordinary skill in the art would recognize that performing computer vision functions on natural or surveillance scenes is typically very difficult, given that these scenes can include an extremely large number of object classes and many of the object classes can have large intra-class variations. The techniques described herein can be performed on any type of scene, including natural scenes, surveillance scenes, and non-natural scenes.

Each of the images 130 (or the corresponding scenes captured in the images 130) can include one or more objects 135. Generally speaking, any type of object may be included in an image 130, and the types of objects 135 included in an image 130 can vary greatly. The objects 135 included in an image 130 may correspond to various types of inanimate articles (e.g., beds, desks, windows, tools, appliances, industrial equipment, curtains, sporting equipment, fixtures, vehicles, etc.), living things (e.g., human beings, animals, plants, etc.), structures (e.g., buildings, houses, etc.), and/or the like. For example, an image 130 of a bedroom may include objects 135 corresponding to a bed, desk, dresser, and/or other bedroom objects. Likewise, an image 130 of a playground may include objects 135 corresponding to a swing set, a basketball hoop, sports equipment, children, and/or other objects. The term "object," as used herein is intended to be used very broadly and may refer to any physical or non-physical entity that is capable of being counted in an image 130.

The images 130 received by the computer vision system 150 can be provided to the neural network architecture 140 for processing and/or analysis. In certain embodiments, the neural network architecture 140 may comprise a convolutional neural network (CNN), or a plurality of convolutional neural networks. Each CNN may represent an artificial neural network that is inspired by biological processes, and may be configured to analyze images 130 and to execute deep learning functions and/or machine learning functions on the images 130. Each CNN may include a plurality of layers including, but not limited to, one or more input layers, one or more output layers, one or more convolutional layers (e.g., that include learnable filters), one or more ReLU (rectifier linear unit) layers, one or more pooling layers, one or more fully connected layers, one or more normalization layers, etc. The configuration of the CNNs and their corresponding layers enable the CNNs to learn and execute various functions for analyzing, interpreting, and understanding the images 130.

In certain embodiments, the neural network architecture 140 can trained to perform one or more computer vision functions to analyze the images 130. For example, the neural network architecture 140 can analyze an image 130 to perform object counting functions, which may include predicting or determining a total number of objects 135 in an image and/or predicting or determining a total number of objects 135 in each of a plurality of object categories. The task of performing object counting functions may involve classifying each of the objects into object categories to enable counting the objects. The neural network architecture 140 can additionally, or alternatively, analyze the image 130 to perform instance segmentation functions, which may include identifying locations of objects 135 in the image 130. In certain embodiments, the instance segmentation functions are able to identify each object instance included in an image 130 with pixel-level accuracy. The instance segmentation functions can additionally, or alternatively, identify locations of objects 135 in other ways as well.

The neural network architecture 140 of the computer vision system 150 is configured to generate and output analysis information 160 based on an analysis of the images 130. The analysis information 160 for an image 130 can generally include any information or data associated with analyzing, interpreting, understanding, and/or classifying the images 130 or the objects 135 included in the images 130. In certain embodiments, the analysis information 160 can include information or data that indicates the results of the computer vision functions performed by the neural network architecture 140. For example, the analysis information 160 may include information that identifies the results associated with image counting, classification, instance segmentation, and/or other functions.

In certain embodiments, the analysis information 160 can include global count information that identifies the number of object instances detected in an image 130 and/or the number of object instances detected in an image 130 on a per-category basis (e.g., indicating the total number of objects 135 within each object category that is identified in an image 130). The analysis information 160 can further include data that indicates the locations of the objects 135 identified in the image 130. For example, the analysis information 160 for an image 130 can include an annotated version of the image which identifies each of the objects 135 in the image (and which possibly assigns separate colors to each of the objects 135 and/or which includes lines or annotations surrounding the perimeters, edges, or boundaries of the objects). Additionally, or alternatively, the analysis information 160 can include other types of data or information for identifying the locations of objects (e.g., such as coordinates of the objects 135 and/or density maps identifying locations of objects 135). Other types of analysis information 160 can be output by the neural network architecture 140 as well.

As discussed in further detail throughout this disclosure, the neural network architecture 140 can be trained to perform these and other computer vision functions using a novel training procedure. In certain embodiments, the training procedure is performed at the image-level using training images that only include ground-truth information indicating the number of different object instances in each of the plurality of training images. In certain embodiments, the image-level supervised training technique can be based on an ILC-based procedure that trains the neural network architecture 140 to accurately count and identify locations of large numbers of objects 135 with great intra-class variance and under heavy occlusions, despite being trained with limited reduced annotation information. That is, for a given training image, object count annotations are only provided for object categories having counts within a subitizing range (e.g., within a range of 1-4), and annotation information is not needed for object categories having counts that exceed the subitizing range. During this image-level supervised training procedure, a loss function, which includes parameters for predicting the global count and spatial distribution of objects, enables the neural network architecture 140 to learn how to construct density maps for each category of objects 135. Once trained, the neural network architecture 140 can construct density maps from images that can be used to perform object counting, instance segmentation, and/or other computer vision functions.

In the exemplary system 100 shown in FIG. 1, the computer vision system 150 may be stored on, and executed by, the one or more servers 120. In other exemplary systems, the computer vision system 150 can additionally, or alternatively, be stored on, and executed by, the computing devices 110 and/or other devices. For example, in certain embodiments, the computer vision system 150 can be integrated directly into a camera device to enable the camera device 130 to analyze images using the techniques described herein. Likewise, the computer vision system 150 can also be stored as a local application on a computing device 110, or integrated with a local application stored on a computing device 110, to implement the techniques described herein. For example, in certain embodiments, the computer vision system 150 can be integrated with (or can communicate with) various applications including, but not limited to, surveillance applications, automated vehicle applications, image editing applications, social media applications, and/or other applications that are stored on a computing device 110 and/or server 120.

In certain embodiments, the one or more computing devices 110 can enable individuals to access the computer vision system 150 over the network 190 (e.g., over the Internet via a web browser application). For example, after a camera device (e.g., which may be directly integrated into a computing device 110 or may be a device that is separate from a computing device 110) has captured one or more images 130, an individual can utilize a computing device 110 to transmit the one or more images 130 over the network 190 to the computer vision system 150. The computer vision system 150 can analyze the one or more images 130 using the techniques described in this disclosure. The analysis information 160 generated by the computer vision system 150 can be transmitted over the network 190 to the computing device 110 that transmitted the one or more images 130 and/or to other computing devices 110.

As mentioned throughout this disclosure, the techniques described herein are able to train the neural network architecture 140 without relying on instance-level supervision techniques. This is beneficial because such instance-level supervision techniques typically require training images to include user-intensive annotations (e.g., such as point-level annotations or bounding boxes that identify objects and their locations in the images) on the images and the objects included in the images. However, it should be understood that certain embodiments of the computer vision system 150 may utilize instance-level supervision techniques to supplement the image analysis techniques described herein.

Figure 2:
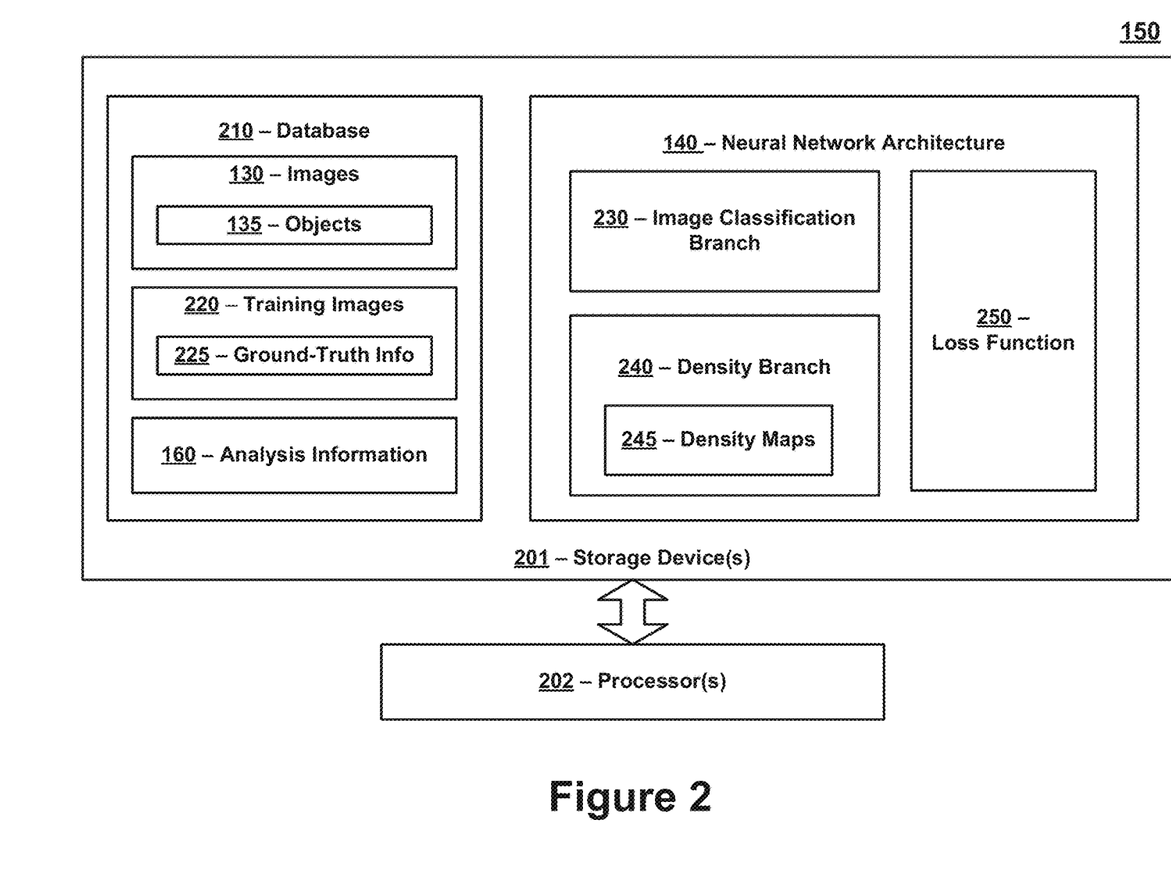
FIG. 2 is a block diagram of an exemplary computer vision system in accordance with certain embodiments.

FIG. 2 is a block diagram of a computer vision system 150 in accordance with certain embodiments of the present invention. The computer vision system 150 includes one or more storage devices 201 that are in communication with one or more processors 202. The one or more storage devices 201 can include: i) non-volatile memory, such as, for example, read only memory (ROM) or programmable read only memory (PROM); and/or (ii) volatile memory, such as, for example, random access memory (RAM), dynamic RAM (DRAM), static RAM (SRAM), etc. In these or other embodiments, storage devices 201 can comprise (i) non-transitory memory and/or (ii) transitory memory. The one or more processors 202 can include one or more graphical processing units (GPUs), central processing units (CPUs), controllers, microprocessors, digital signal processors, and/or computational circuits. The one or more storage devices 201 can store data and instructions associated with one or more databases 210 and a neural network architecture 140 that comprises an image classification branch 230, a density branch 240 and a loss function 250. The one or more processors 202 are configured to execute instructions associated with these components. Each of these components is described in further detail below.

The database 210 stores the images 130 that are provided to and/or analyzed by the computer vision system 150, as well the analysis information 160 that is generated by the computer vision system 150. The database 210 also stores a set of training images 220 that are utilized to train the neural network architecture 140. The training images 220 may be annotated with ground-truth information 225. Exemplary training images 220 that may be used to train the neural network architecture 140 can include images included in the Pascal VOC (Visual Object Classes), COCO (Common Objects in Context) datasets, and/or other datasets. The training images 220 can include images 130 of natural scenes corresponding to both indoor and outdoor environments.

In certain embodiments, the ground-truth information 225 only includes annotations indicating the global object counts for each of the training images 220. For example, the ground-truth information 225 for an image may indicate how many objects 135 are included in each object category within an image 130. For example, an image 130 of a park that includes seven people, two benches, and a slide may be annotated with ground-truth information 225 indicating that the image includes seven objects within a person object category, two objects within a bench object category, and one object within a slide object category.

In certain embodiments, the image-level supervision is based on an ILC supervision technique in which the training images 220 provided to the neural network architecture 140 are only annotated with ground-truth information 225 that identifies an object count for each object category within a subitizing range. The subitizing range can vary, but in some cases may be within a range of 1 to 4. For example, in such embodiments, the ground-truth information 225 may indicate a count for each object category in a training image that includes four or less objects 135. For categories that include counts exceeding four objects, the ground-truth information 225 can simply identify these categories as including more than four objects without specifying actual counts for the categories. This can assist with reducing the burden of providing user-intensive annotations on the images. Despite providing such limited ground-truth information 225, the ILC supervision techniques described herein are able to sufficiently train the neural network architecture 140 to perform common object counting and instance segmentation functions on images 130 to identify objects 135 in the images far beyond the subitizing range (e.g., to identify 10, 20, or 50 objects in each of the object categories included in an image 130).

The neural network architecture 140 can be trained to perform various computer vision functions including, but not limited to, functions for common object counting (which can include classifying objects 135 in images 135 into categories and counting the objects 130 in each category), and instance segmentation (which can include identifying locations of objects 135 in images with pixel-level accuracy). In certain embodiments, the neural network architecture 140 can include an ImageNet pre-trained network backbone (e.g., such as ResNet50) that is modified and connected to two output branches comprising an image classification branch 230 and a density branch 240.

The image classification branch 230 can be trained and configured to determine or estimate the presence or absence of objects 135 in the images 130. The image classification branch 230 also can be trained and configured to determine whether the objects are included in specific object categories (e.g., a person object category, a car object category, etc.). To facilitate performance of these functions, the image classification branch 230 may generate object category maps using a fully convolutional architecture. Local maxima information can be derived from the object category maps to produce peak maps corresponding to the images, and the peak maps can be used to compute class confidence scores. This exemplary technique for determining or estimating the presence or absence of objects 135, which is discussed in further detail below, can be useful for delineating multiple instances from the same object category.

The density branch 240 of the neural network architecture 140 can be trained and configured to perform functions associated with constructing density maps 245 and utilizing the density maps 245 to predict or determine the global object counts in images 130 and to identify locations of object instances in the images 130. The density maps 245 may be constructed on a per-category basis such that a separate density map 245 is constructed for each object category to predict the global count and spatial distribution of objects 135 in each of the categories. While certain approaches for constructing density maps may require instance-level ground-truth information to be utilized during training, the neural network architecture 140 is able to learn how to generate the density maps 245 without such information. Instead, the neural network architecture 140 can derive pseudo ground-truth information by exploiting the coarse-level localization capabilities of an image classification branch 230 and it can utilize the pseudo ground-truth information for training the density branch 240 to generate the density maps 245. For example, in certain embodiments, the peak maps generated by the image classification branch 230 may be utilized to generate pseudo ground-truth masks that can assist the density branch 240 with constructing or generating the density maps 245. Object counting functions can be carried out by performing a summation on a density map 245 derived from an image 130. Also, because the density maps 245 are generated in a manner that preserves the spatial distribution of objects 135, the density maps 245 can be utilized to localize each object instance with pixel-level accuracy.

A loss function 250 comprising multiple loss metrics may be utilized to jointly train the image classification branch 230 and the density branch 240 of the neural network architecture 140. The loss function 250 jointly optimizes the neural network architecture 140 to predict object locations and global object counts in the density maps 245. In certain embodiments, the loss function 250 trains the density branch 240 to construct density maps 245 for each of a plurality of object categories, and it includes explicit terms or loss criteria (e.g., $\mathcal{L}_{spatial}$ and $\mathcal{L}_{global}$ discussed below) for predicting the global counts and spatial distribution of objects 135. The loss function 250 can further include a multi-label image classification loss (e.g., $\mathcal{L}_{class}$ discussed below) for training the image classification branch 230 to accurately identify the presence or absence of objects 135. The discussion below with respect to FIG. 3 provides further details regarding exemplary implementations of the image classification branch 230, the density branch 240, and the loss function 250.

Exemplary embodiments of the computer vision system 150 and the aforementioned sub-components (e.g., database 210, neural network architecture 140, image classification branch 230, density branch 240, etc.) are described in further detail below. While the sub-components of the computer vision system 150 may be depicted in FIG. 2 as being distinct or separate from one other, it should be recognized that this distinction may be a logical distinction rather than a physical distinction. Any or all of the sub-components can be combined with one another to perform the functions described herein, and any aspect or feature that is described as being performed by one sub-component can be performed by any or all of the other sub-components. Also, while the sub-components of the computer vision system 150 may be illustrated as being implemented in software in certain portions of this disclosure, it should be recognized that the sub-components described herein may be implemented in hardware and/or software.

Figure 3:
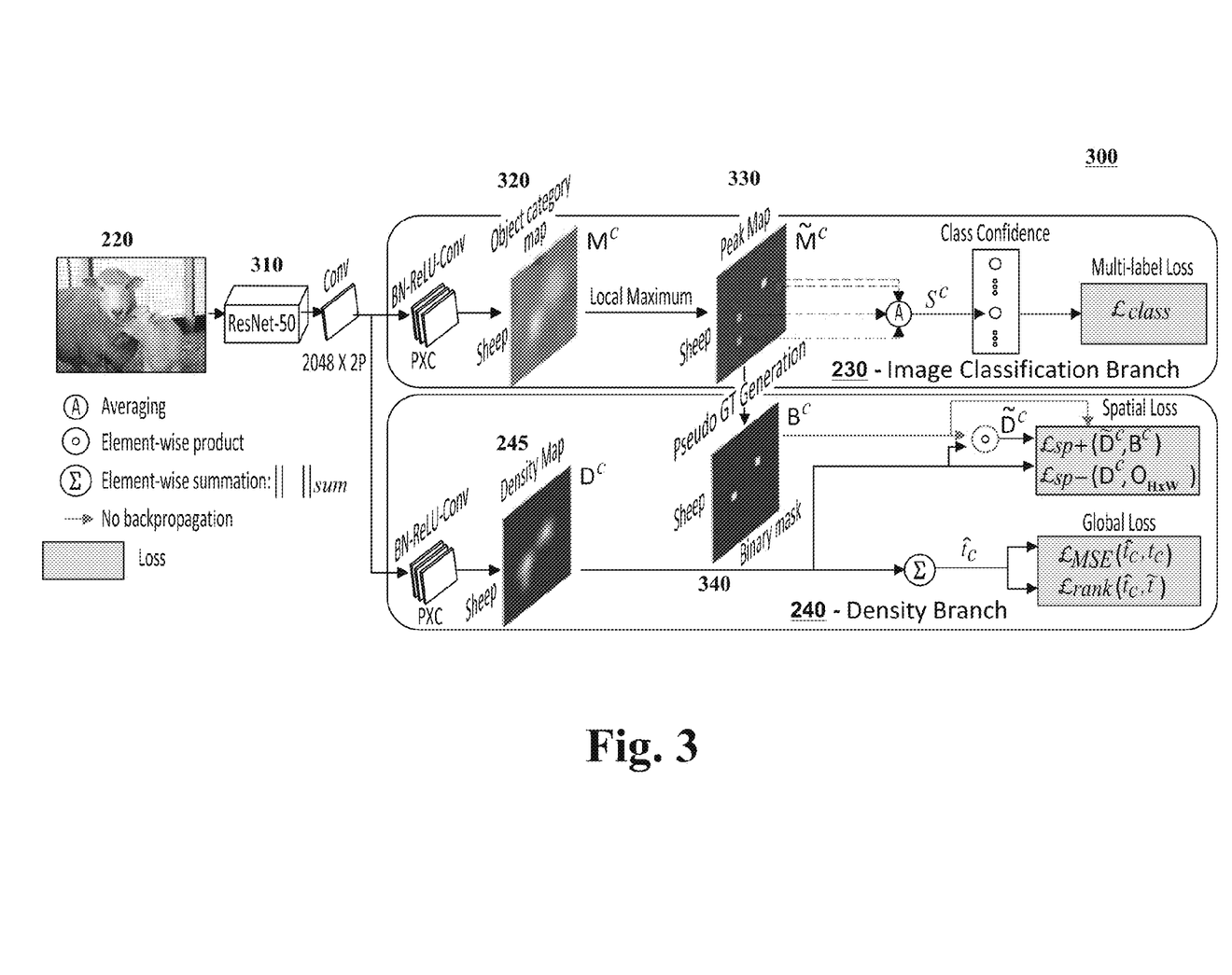
FIG. 3 is a diagram illustrating an exemplary architecture for a computer vision system in accordance with certain embodiments.

FIG. 3 is a diagram illustrating an exemplary architecture 300 for a computer vision system 150 in accordance with certain embodiments. The architecture 300 illustrates, inter alia, exemplary configurations for the image classification branch 230 and the density branch 240, and it demonstrates how these branches can be trained utilizing the image-level supervision techniques discussed in this disclosure. The boxes highlighted in blue illustrate exemplary terms or criteria that may be utilized by the loss function 250 to train the image classification branch 230 and the density branch 240 of the architecture 300.

The architecture 300 includes a pre-trained neural network 310. The pre-trained neural network 310 may represent a convolution neural network or other neural network configuration that has been trained with one or more image datasets (e.g., using images included in the ImageNet dataset) to perform certain computer vision or analysis functions. For example, in certain embodiments, ResNet50 may be utilized as the pre-trained neural network 310. Regardless of which pre-trained neural network 310 is utilized, modifications can be made to the pre-trained neural network 310 to adapt the pre-trained neural network 310 for use with the techniques described in this disclosure.

For example, in scenarios in which ResNet50 is utilized as the pre-trained neural network 310, the global pooling layer can be removed and the fully connected layer of the pre-trained neural network 310 can be adapted with a 1×1 convolution having 2P channels as output. The 2P channels can be divided equally between the image classification branch 230 and the density branch 240 as shown. A 1×1 convolution having C output channels can be added in each branch, resulting in a fully convolutional network. In this scenario, C corresponds to the number of object categories and P is empirically set to be proportional to C. For example, in certain embodiments, P can be set to 1.5 C. In both the image classification branch 230 and the density branch 240, the convolution is preceded by a batch normalization and a ReLU layer. The image classification branch 230 is configured to generate object category maps 320 and the density branch 240 is configured to generate a density map 245 for each object category.

The Loss Function

Before discussing the exemplary configurations of the image classification branch 230 and the density branch 240, a description is provided of an exemplary loss function 250 that may be utilized to jointly train these branches.

Let I be a training image and $t=\{t_1, t_2, \ldots, t_c, t_C\}$ be the corresponding vector for the ground-truth count of C object categories. Instead of using an absolute object count, a lower-count strategy (e.g., an ILC-based strategy) can be employed to reduce the amount of image-level supervision. Given an image I, object categories are divided into three non-overlapping sets based on their respective instance counts. The first set, A, indicates object categories that are absent in I (i.e., $t_c=0$). The second set, S, represents categories within an exemplary pre-determined subitizing range (i.e., $0 < t_c \leq 4$). The final set, $\tilde{S}$, indicates categories beyond the subitizing range (i.e., $t_c \geq \tilde{t}$, where $\tilde{t}=5$).

Let $M=\{M^1, M^2, \ldots, M^c, \ldots, M^C\}$ denote the object category maps 320 in the image classification branch 230, where $M^c \in \mathbb{R}^{H \times W}$. Let $D=\{D^1, D^2, \ldots, D^c, \ldots, D^C\}$ represent density maps 245 produced by the density branch 240, where $D^c \in \mathbb{R}^{H \times W}$. Here, H×W is the spatial size of both the object category and density maps. The image classification and density branches may be jointly trained, in an end-to-end fashion, given only ILC supervision with the following loss function:

$$\mathcal{L} = \mathcal{L}_{class} + \mathcal{L}_{spatial} + \mathcal{L}_{global} \quad (1)$$

where:

$\mathcal{L}_{class}$ is a multi-label image classification loss for the classification branch;

$\mathcal{L}_{spatial}$ is a loss for localizing individual object instances and used to train the density branch; and $\mathcal{L}_{global}$ is a loss for constraining the global object count to be that of the ground truth and it used to train the density branch.

In the above equation, the first term ($\mathcal{L}_{class}$) refers to multi-label image classification loss, and the last two terms ($\mathcal{L}_{spatial}$ and $\mathcal{L}_{global}$) are used to train the density branch.

Image Classification Branch

This section describes an exemplary configuration of the image classification branch 230, which is configured to estimate the presence or absence of objects in images.

Certain approaches for training a density map 245 may utilize instance-level supervision, such as point-level annotations. Because such information may be unavailable in the ILC-supervised setting described herein, the techniques described herein may generate pseudo ground-truth masks 340 to account for the unavailability of such instance-level annotations. The pseudo ground-truth masks 340 can be generated by exploiting the coarse-level localization capabilities of an image classifier via object category maps 320. These object category maps 320 are generated from the fully convolutional architecture shown in FIG. 3.

While specifying classification confidence at each image location, class activation maps (CAMs) typically struggle to delineate multiple instances from the same object category. To address this issue in the context of accurately image-level supervised instance segmentation, the local maxima of CAMs can be further boosted to produce object category maps 320 during an image-classifier training procedure which aims at falling on distinct object instances. The local maxima locations can be used to generate pseudo ground-truth masks 340 for training the density branch 240.

As described earlier, object categories in I can be divided into three non-overlapping sets: A, S and $\tilde{S}$. To train a one-versus-rest image classifier, binary labels are derived from $t_c$ that indicate the presence $\forall c \in \{S, \tilde{S}\}$ or absence $\forall c \in A$ of object categories. Let $\tilde{M}^c \in \mathbb{R}^{H \times W}$ be the peak map derived from $c^{th}$ object category map ($M^c$) of M such that:

$$\tilde{M}^c(i,j) = \begin{cases} M^c(i,j), & \text{if } M^c(i,j) > M^c(i-r_i, j-r_j), \\ 0, & \text{otherwise} \end{cases}$$

where:

$M^c$ is c-th object category map;

i is the index corresponding to the $i^{th}$ row of $M^c$;

j is the index corresponding to the $j^{th}$ column of $M^c$;

$r_i$ is a integer within $[-r, r]$, and $r=1$; and $r_j$ is an integer within $[-r, r]$, and $r=1$.

Here, $-r \leq r_i \leq r, -r \leq r_j \leq r$ where r is the radius for the local maxima computation, and r is set to $r=1$. The local maxima are searched at all spatial locations with a stride of one. To train an image classifier, a class confidence score $s^c$ of the $c^{th}$ object category is computed as the average of non-zero elements of $\tilde{M}^c$. A multi-label soft-margin loss can be used for binary classification.

Density Branch

This section describes an exemplary configuration of the density branch 240, which predicts the global object count and the spatial distribution of object instances by constructing density maps 245.

The image classification branch 230 described above predicts the presence or absence of objects by using the class confidence scores derived from the peak map $\tilde{M}^c$. However, in certain cases, it may struggle to differentiate between multiple objects and single object parts due to the lack of prior information about the number of object instances. This may cause a large number of false positives in the peak map $\tilde{M}^c$. To address this issue, the count information may be utilized in conjunction with a pseudo ground-truth generation scheme that prevents training of the density maps 245 at those false positive locations. This pseudo ground-truth generation scheme is discussed in further detail below.

When constructing a density map, it may be desired to estimate accurate object counts at any image sub-region. The spatial loss term $\mathcal{L}_{spatial}$ in Eq. 1 above ensures that individual object instances are localized while the global term $\mathcal{L}_{global}$ constrains the global object count to that of the ground-truth. This enables preservation of the spatial distribution of object counts in the density map 245. As explained in further detail below, this property also helps to improve instance segmentation.

Spatial Loss

The spatial loss $\mathcal{L}_{spatial}$ can be divided into the loss $\mathcal{L}_{sp+}$ which enhances the positive peaks corresponding to instances of object categories within S, and the loss $\mathcal{L}_{sp-}$ which suppresses false positives of categories within A. Due to the unavailability of absolute object count, the set $\tilde{S}$ is not used in the spatial loss and is treated separately later. To enable ILC-supervised density map training using $\mathcal{L}_{spatial}$, a pseudo ground-truth binary mask 340 can be generated from peak map $\tilde{M}^c$.

Pseudo Ground-Truth Generation

To compute the spatial loss $\mathcal{L}_{sp+}$, a pseudo ground-truth mask 340 is generated for set S. For all object categories $c \in S$, the $t_c$-th highest peak value of peak map $\tilde{M}^c$ is computed using a heap-max algorithm. The $t_c$-th highest peak value $h_c$ is then used to generate a pseudo ground-truth binary mask $B^c$ as:

$$B^c = u(\tilde{M}^c - h_c) \quad (2)$$

where:

$\tilde{M}^c$ is the peak map of c-th object category;

$h_c$ is the $t_c$-th highest peak value of $c^{th}$ object category map $M^c$; and u is the symbol representing a unit step function.

Here, $u(n)$ is a unit step function which is 1 only if $n \geq 0$. Although the non-zero elements of the pseudo ground-truth mask $B^c$ indicate object locations, its zero elements do not necessarily point towards the background. Therefore, a masked density map $\tilde{D}^c$ is constructed to exclude density map $D^c$ values at locations where the corresponding $B^c$ values are zero. Those density map $D^c$ values should also be excluded during the loss computation in Eq. 4 and back-propagation (which is discussed further below), due to the risk of introducing false negatives. This is achieved by computing the Hadamard product between the density map $D^c$ and $B^c$ as:

$$\tilde{D}^c = D^c \odot B^c \quad (3)$$

where:
$D^c$ is the density map of c-th object category;
$B^c$ is the pseudo-ground truth mask of c-th object category; and
$\tilde{D}^c$ is the masked density map of c-th object category.

The spatial loss $\mathcal{L}_{sp+}$ for object categories within the subitizing range S can be computed between $B^c$ and $\tilde{D}^c$ using a logistic binary cross entropy (logistic BCE) loss for positive ground-truth labels. The logistic BCE loss transfers the network prediction ($\tilde{D}^c$) through a sigmoid activation layer a and computes the standard BCE loss as:

$$\mathcal{L}_{sp+}(\tilde{D}^c, B^c) = -\sum_{\forall c \in S} \frac{\|B^c \odot \log(\sigma(\tilde{D}^c))\|_{sum}}{|S| \cdot \|B^c\|_{sum}}. \quad (4)$$

where:
$B^c$ is the pseudo-ground truth mask of c-th object category;
$\tilde{D}^c$ is the masked density map of c-th object category;
S is set containing categories with counts within the subitizing range for image I;
$\mathcal{L}_{sp+}$ is the spatial loss for object categories within the subitizing range S;
σ is the symbol representing a sigmoid function.

Here, |S| is the cardinality of the set S and the norm $\| \|_{sum}$ is computed by taking the summation over all elements in a matrix. For example, $\|B^c\|_{sum} = 1^h B^c 1^w$, where $1^h$ and $1^w$ are all-ones vectors of size 1×H and W×1, respectively. Here, the highest $t_c$ peaks in $\tilde{M}^c$ are assumed to fall on $t_c$ instances of object category c∈S. Due to the unavailability of ground-truth object locations, this assumption is used and it has been observed that it holds in most scenarios.

The spatial loss $\mathcal{L}_{sp+}$ for the positive ground-truth labels enhances positive peaks corresponding to instances of object categories within S. However, the false positives of the density map for c∈S are not penalized in this loss. Therefore, another term, $\mathcal{L}_{sp-}$, is introduced into the loss function to address the false positives of c∈A. For c∈A, positive activations of $D^c$ indicate false detections. A zero-valued mask $O_{H \times W}$ is used as ground-truth to reduce such false detections using logistic BCE loss.

$$\mathcal{L}_{sp-}(D^c, O_{H \times W}) = -\sum_{c \in A} \frac{\|\log(1 - \sigma(D^c))\|_{sum}}{|A| \cdot H \cdot W} \quad (5)$$

where:
$D^c$ is the density map of c-th object category;
$O_{H \times W}$ is a zero matrix of size H×W;
σ is the symbol representing a sigmoid function;
A is the set containing object categories which are absent in image I;
H is the number of rows of $D^c$;
W is the number of columns of $D^c$; and
$\mathcal{L}_{sp-}$ is the spatial loss for suppressing the false positives in $D^c$ if c∈A.

Though the spatial loss ensures the preservation of spatial distribution of objects, only relying on local information may result in deviations in the global object count.

Global Loss

The global loss penalizes the deviation of the predicted count $\hat{t}_c$ from the ground-truth. It has two components: ranking loss $\mathcal{L}_{rank}$ for object categories beyond the subitizing range (i.e., $\forall c \in \tilde{S}$) and mean-squared error (MSE) loss $\mathcal{L}_{MSE}$ for the rest of the categories. $\mathcal{L}_{MSE}$ penalizes the predicted density map, if the global count prediction does not match with the ground-truth count:

$$\mathcal{L}_{MSE}(\hat{t}_c, t_c) = \sum_{c \in \{A, S\}} \frac{(\hat{t}_c - t_c)^2}{|A| + |S|} \quad (6)$$

where:
$\mathcal{L}_{MSE}$ is the mean-squared error loss;
$t_c$ is the ground-truth count for the c-th object category;
$\hat{t}_c$ is the predicted count for the c-th object category; and
S is set containing categories with counts within the subitizing range for image I.

Here, the predicted count $\hat{t}_c$ is the accumulation of the density map for a category c over its entire spatial region, i.e., $\hat{t}_c = \|D^c\|_{sum}$. Note that object categories in $\tilde{S}$ were not previously considered in the computation of spatial loss $\mathcal{L}_{spatial}$ and mean-squared error loss $\mathcal{L}_{MSE}$. Here, a ranking loss is introduced with a zero margin that penalizes undercounting for object categories within S:

$$\mathcal{L}_{rank}(\hat{t}_c, \tilde{t}) = \sum_{c \in \tilde{S}} \frac{\max(0, \tilde{t} - \hat{t}_c)}{|\tilde{S}|} \quad (7)$$

where:
$\mathcal{L}_{rank}$ is the ranking loss;
$\hat{t}_c$ is the predicted count for the c-th object category;
$\tilde{S}$ is set containing categories with counts beyond subitizing range for image I; and
$\tilde{t}$ is a constant and $\tilde{t} = 5$.

The ranking loss penalizes the density branch if the predicted object count $\hat{t}_c$ is less than $\tilde{t}$ for c∈$\tilde{S}$. Recall, the beyond subitizing range $\tilde{S}$ starts from $\tilde{t} = 5$.

Within the subitizing range S, the spatial loss term $\mathcal{L}_{spatial}$ is optimized to locate object instances, while the global MSE loss ($\mathcal{L}_{MSE}$) is optimized for accurately predicting the corresponding global count. Due to the joint optimization of both these terms within the subitizing range, the network learns to correlate between the located objects and the global count. Further, the network is able to locate object instances, generalizing beyond the subitizing range S. Additionally, the ranking loss $\mathcal{L}_{rank}$ term in the proposed loss function ensures the penalization of under counting beyond the subitizing range S.

Mini-Batch Loss

Normalized loss terms $\hat{\mathcal{L}}_{sp+}$, $\hat{\mathcal{L}}_{sp-}$, $\hat{\mathcal{L}}_{MSE}$ and $\hat{\mathcal{L}}_{rank}$ are computed by averaging respective loss terms over all images in a mini-batch. The $\hat{\mathcal{L}}_{spatial}$ is computed by $\hat{\mathcal{L}}_{sp+} + \hat{\mathcal{L}}_{sp-}$. For categories beyond the subitizing range, $\hat{\mathcal{L}}_{rank}$ can lead to over-estimation of the count. Therefore, $\hat{\mathcal{L}}_{global}$ can be computed by assigning a relatively lower weight (λ=0.1) to $\hat{\mathcal{L}}_{rank}$, i.e., $\hat{\mathcal{L}}_{global} = \hat{\mathcal{L}}_{MSE} + \lambda * \hat{\mathcal{L}}_{rank}$.

Training and Inference

The network shown in architecture 300 can be trained in two stages. In the first stage, the spatial loss $\mathcal{L}_{spatial}$ term is excluded from Eq. 1 because it may require pseudo ground-truth information 340 generated from the image classification branch 230. The second stage includes the spatial loss.

$B^c$, which is derived from the image classification branch 230, can be used as a pseudo ground-truth mask 340 to train the density branch 240. Therefore, the backpropagation of gradients through $B^c$ to the classifier branch is not required (shown with green arrows in FIG. 3). In the density branch 240, the Hadamard product of the density map with $B^c$ can be used in Eq. 3 to compute $\mathcal{L}_{sp+}$ for $c \in S$. Hence, the gradients ($\delta^c$) for the $c^{th}$ channel of the last convolution layer of the density branch, due to $\mathcal{L}_{sp+}$, can be computed as:

$$\delta^c_{sp+} = \frac{\partial \hat{\mathcal{L}}_{sp+}}{\partial \tilde{D}^c} \odot B^c \qquad (8)$$

where:

$D^c$ is the marked density map of c-th object category;

$B^c$ is the pseudo-ground truth mask of c-th object category; and $\hat{\mathcal{L}}_{sp+}$ is the normalized loss term by averaging $\mathcal{L}_{sp+}$ over all images in the mini-batch.

Because $\mathcal{L}_{MSE}$, $\mathcal{L}_{rank}$ and $\mathcal{L}_{sp-}$ are computed using MSE, ranking and logistic BCE losses on convolution outputs, their respective gradients can be computed using a pytorch implementation.

The image classification branch 230 outputs a class confidence score $s^c$ for each class, indicating the presence ($\hat{t}_c > 0$, if $s^c > 0$) or absence ($\hat{t}_c = 0$, if $s^c \leq 0$) of the object category c. The predicted count $\hat{t}_c$ is obtained by summing the density map $D^c$ for category c over its entire spatial region. The exemplary system only utilizes subitizing annotations ($t_c \leq 4$) and accurately predicts object counts for both within and beyond the subitizing range.

Image-Level Supervised Instance Segmentation

As mentioned above, the proposed ILC-supervised density map estimation system can also be utilized for instance segmentation. Note that the local summation of an ideal density map over a ground-truth segmentation mask is 1. This property can be used to improve image-level supervised instance segmentation using peak response maps 330 (PRMs). PRM techniques can employ a scoring metric that combines instance level cues from peak response maps R, class-aware information from object category maps and spatial continuity priors. The peak response maps 330 may be generated from local maxima (peaks of $\tilde{M}^c$) through a peak back-propagation process. The scoring metric can then be used to rank object proposals corresponding to each peak for instance mask prediction. The scoring metric can be improved by introducing an additional term $d_p$ in the metric. The term $d_p$ penalizes an object proposal $P_r$, if the predicted count in those regions of the density map $D^c$ is different from one, as $d_p = |1 - \|D^c \cdot P_r\|_{sum}|$. Here, | | is the absolute value operator. For each peak, the new scoring metric Score selects the highest scoring object proposal $P_r$:

$$\text{Score} = \alpha \cdot R * P_r + R * \hat{P}_r - \beta \cdot Q * P_r - \gamma \cdot d_p \qquad (9)$$

where:

α, β, and γ are the class-independent hyper parameters empirically set based on the validation set;

R is the peak response map;

$P_r$ is the object proposal;

$\hat{P}_r$ is the contour mask of the proposal $P_r$ derived using a morphological gradient;

Q is the background mask derived from the object category map; and $d_p$ is the penalty term for an object proposal $P_r$, if the predicted count in those regions of the density map $D^c$ is different from one.

Here, the background mask Q is derived from the object category map 320 and $\hat{P}_r$ is the contour mask of the proposal P derived using a morphological gradient. Class-independent parameters α, β and γ are set on the validation set.

Experiments and Exemplary Implementation Details

Extensive comparative experiments and ablation studies were conducted using the PASCAL VOC and COCO datasets. These experiments and studies have demonstrated the effectiveness and superiority of the techniques described herein. During experimentation, the training parameters can be fixed. An initial learning rate of $10^{-4}$ can be used for the pre-trained neural network 310 (e.g., ResNet-50 modified as described above), while image classification and density branches can be trained with an initial learning rate of 0.01. The number of input channels P of 1×1 convolution for each branch can be set to P=1.5×C. A mini-batch size of 16 can be used for the stochastic gradient descent (SGD) optimizer. The momentum can be set to 0.9 and the weight decay can be set to $10^{-4}$.

Figure 4A:
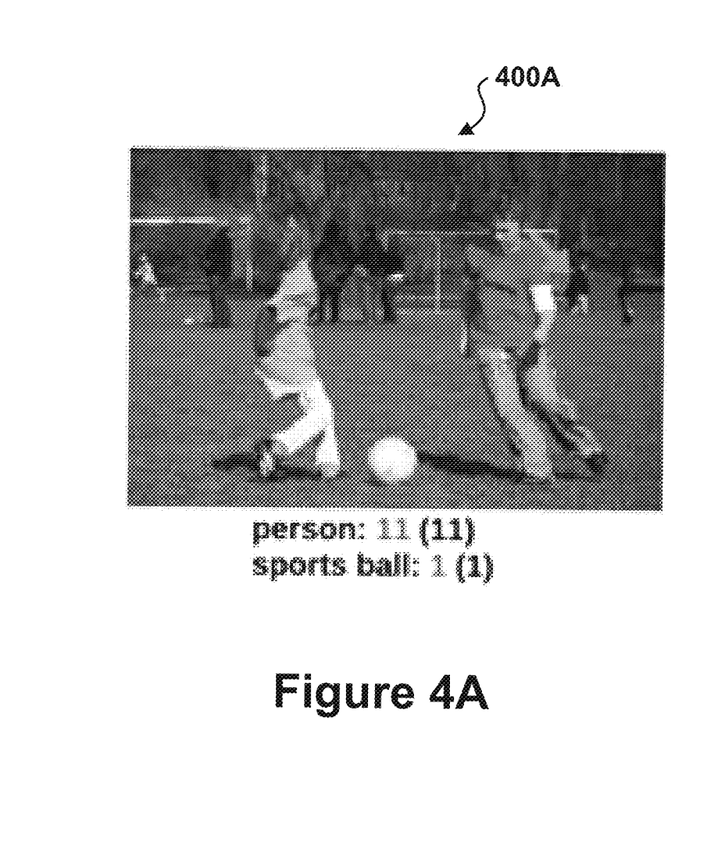
FIG. 4A is an exemplary image shown with analysis information associated with performance of a common object counting function according to certain embodiments.
Figure 4B:
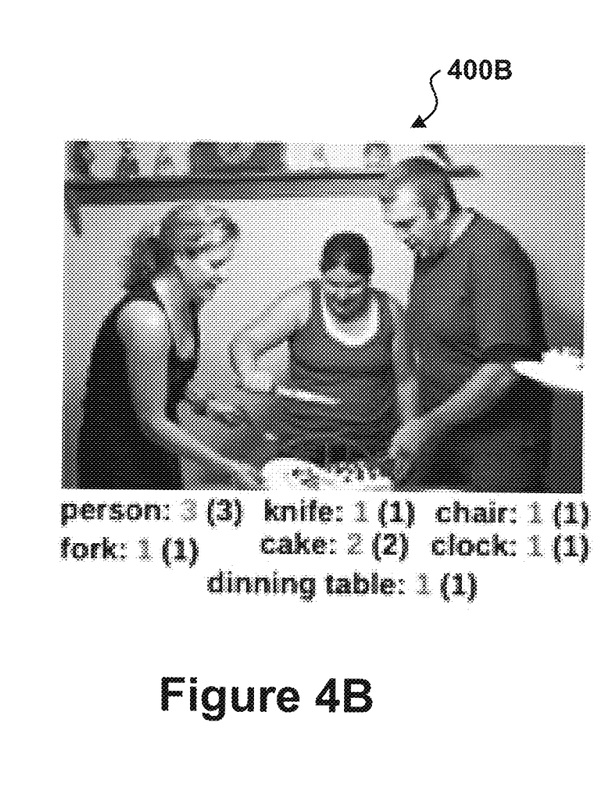
FIG. 4B is another exemplary image annotated with analysis information associated with performance of a common object counting function according to certain embodiments.

FIGS. 4A and 4B include exemplary images 400A and 400B, respectively, from the COCO dataset that have been analyzed by the computer vision system 150 during testing. Analysis information 160 generated by the computer vision system 150 is provided below the images 400A and 400B to demonstrate the accuracy of the computer vision system 150 for performing object counting functions. The predictions of the computer vision system 150 are shown in green, while the actual object counts are shown in black within parentheses. Despite being trained using image-level object counts within a subitizing range of 1-4, the computer vision system 150 accurately counts objects beyond the subitizing range (e.g., see count of 11 person objects) as shown in image 400A. It also does so under heavy occlusion (as shown by the blue arrow that has been added to point out the person in the background). Image 400B further demonstrates the ability of the computer vision system 150 to identify objects in diverse object categories.

Figure 5A:
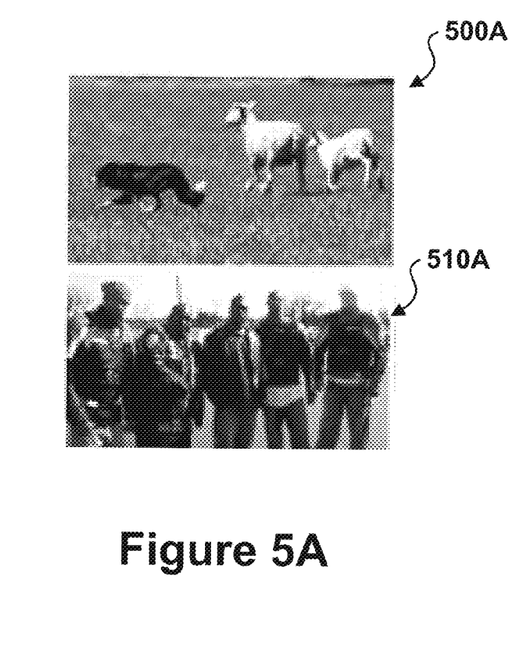
FIG. 5A is an exemplary pair of images comprising a plurality of objects according to certain embodiments.
Figure 5B:
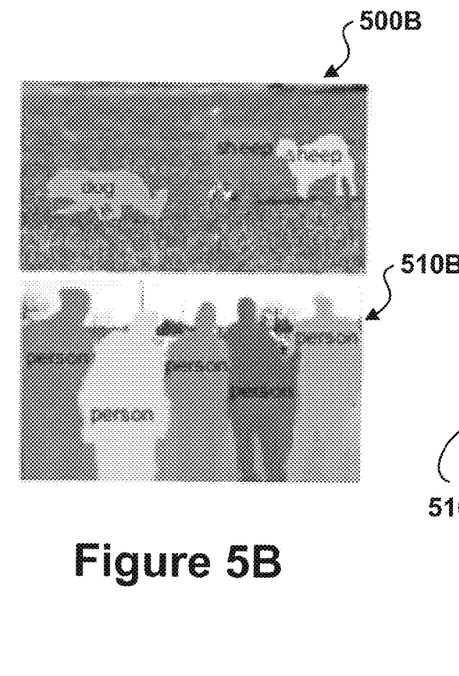
FIG. 5B shows the exemplary pair of images included in FIG. 5A annotated with masks that identify locations of objects according to certain embodiments.
Figure 5C:
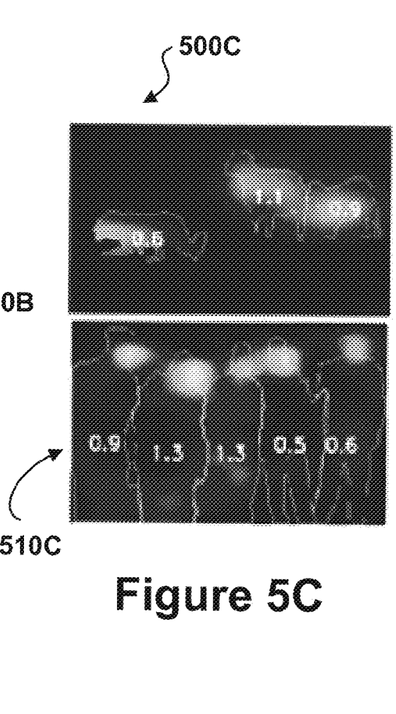
FIG. 5C shows exemplary density maps that are generated based on the exemplary pair of images included in FIG. 5A according to certain embodiments.

FIGS. 5A-5C further demonstrate the ability of the computer vision system 150 to perform instance segmentation functions. FIG. 5A includes a pair of images 500A and 510A that were provided to the computer vision system 150 during testing. These images 500A and 510A were taken from the Pascal VOC 2012 dataset. FIGS. 5B-5C demonstrate exemplary analysis information 160 that was generated by the computer vision system 150 from images 500A and 510A. More specifically, FIG. 5B shows masks that accurately identify the pixel-level locations of the objects in images 500B and 510B, while FIG. 5C shows the corresponding density maps 500C and 510C that were generated from the images 500A and 510A. As shown, the training techniques described herein enable the computer vision system 150 to delineate spatially adjacent objects.

Figure 6:
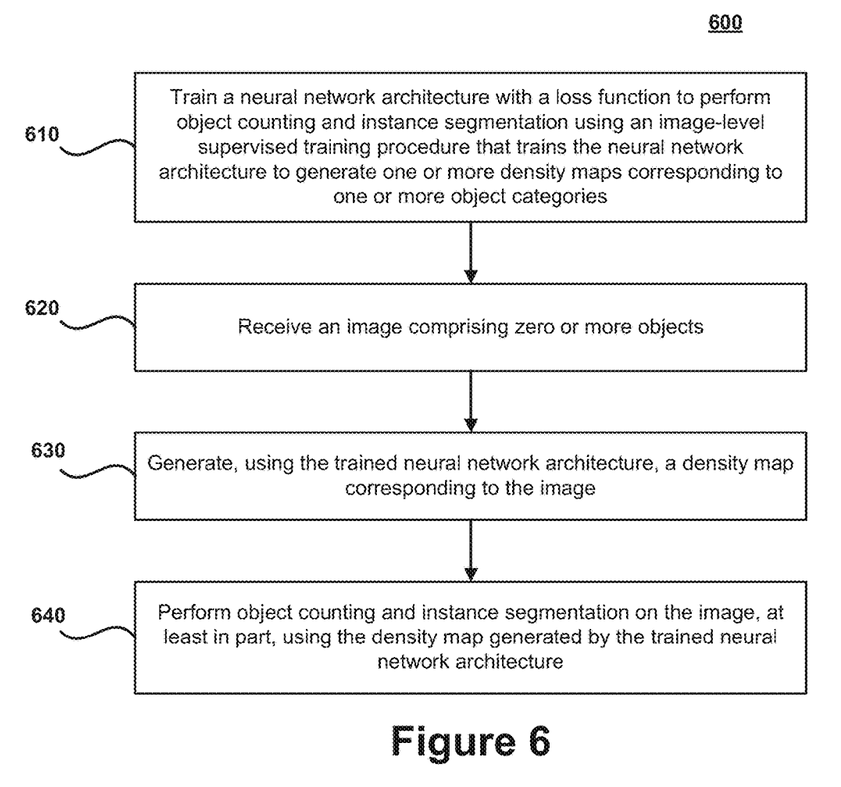
FIG. 6 is a flow chart of an exemplary method according to certain embodiments.

FIG. 6 illustrates a flow chart for an exemplary method 600 according to certain embodiments. Method 600 is merely exemplary and is not limited to the embodiments presented herein. Method 600 can be employed in many different embodiments or examples not specifically depicted or described herein. In some embodiments, the steps of method 600 can be performed in the order presented. In other embodiments, the steps of method 600 can be performed in any suitable order. In still other embodiments, one or more of the steps of method 600 can be combined or skipped. In many embodiments, computer vision system 150 can be suitable to perform method 600 and/or one or more of the steps of method 600. In these or other embodiments, one or more of the steps of method 600 can be implemented as one or more computer instructions configured to run at one or more processing modules (e.g., processor 202) and configured to be stored at one or more non-transitory memory storage modules (e.g., storage device 201). Such non-transitory memory storage modules can be part of a computer system such as computer vision system 150, system 100, and/or system architecture 300.

At step 610, a neural network architecture is trained with a loss function to perform object counting and instance segmentation using an image-level supervised training procedure that trains the neural network architecture to generate one or more density maps corresponding to one or more object categories. As discussed above, the neural network architecture 140 may include a convolutional neural network that is trained to perform object counting and instance segmentation. In certain embodiments, the neural network architecture 140 may include a neural network that is pre-trained using an image dataset (e.g., the ImageNet dataset) and the pre-trained neural network 310 may be modified and connected to an image classification branch 230 and density branch 240 to learn the object counting and instance segmentation functions. The image-level supervised training procedure utilized to train the neural network architecture 140 may only include object count annotations for object categories to reduce the user annotations on the training images. In certain embodiments, the amount of user annotations on the training images may be further reduced using ILC-based approaches as discussed above. The image-level supervised training procedure trains the neural network architecture to generate one or more density maps corresponding to one or more object categories.

At step 620, an image 130 comprising zero or more objects 135 is received. The image 130 may be received at the neural network architecture 140 after it has been trained.

At step 630, a density map corresponding to the image is generated. The density map can be generated by the trained neural network architecture 140.

At step 640, object counting and instance segmentation are performed on the image, at least in part, using the density map generated by the trained neural network architecture. In certain embodiments, the global object count for the image 130 may be determined by performing a summation on density maps 245 corresponding to each object category that is detected in the image 130. The global object count may identify the total number of objects 135 in the image 130 and/or may indicate the number of objects in each object category. The instance segmentation performed on the image 130 may indicate the location of each object 135 included in the image 130 (e.g., by identifying the perimeters or boundaries of the objects with pixel-level accuracy). The density maps 245 preserve information that indicates the spatial distribution of the objects 135, and this information can be utilized to delineate adjacent objects in instance segmentation.

While various novel features of the invention have been shown, described and pointed out as applied to particular embodiments thereof, it should be understood that various omissions and substitutions and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

What is claimed is:

1. A system comprising:
    one or more computing devices comprising one or more processors and one or more non-transitory storage devices for storing instructions, wherein execution of the instructions by the one or more processors causes the one or more computing devices to:
    train a neural network architecture with a loss function to perform object counting and instance segmentation using an image-level supervised training procedure that utilizes training images annotated with ground-truth object count information to train the neural network architecture to generate one or more density maps corresponding to one or more object categories, wherein:
        the image-level supervised training procedure comprises an image-level lower count (ILC) training procedure that trains the neural network architecture using the training images; and
        for each one of the training images, the ground-truth object count information specifies object counts for each object category having an object count within a pre-determined subitizing range, and the ground-truth object count information does not specify the object counts for any object category having an object count exceeding the pre-determined subitizing range;
    receive, at the trained neural network architecture, an image comprising one or more objects;
    generate, using the trained neural network architecture, a density map corresponding to the image; and
    perform object counting and instance segmentation on the image, at least in part, using the density map generated by the trained neural network architecture.

2. The system of claim 1, wherein the trained neural network architecture comprises:
    an image classification branch that is trained to determine a presence or absence of the one or more objects in the image; and
    a density branch that is trained to count the one or more objects in the image and to identify locations of the one or more objects in the image using the density map.

3. The system of claim 1, wherein the loss function at least includes:
    a spatial loss term that is used, at least in part, to train a density branch of the neural network architecture to generate the density map in a manner that enables the density map to preserve a spatial distribution of the one or more objects in the image.

4. The system of claim 3, wherein the loss function further includes:
a global loss term that is used, at least in part, to train the density branch of the neural network architecture to generate the density map in a manner that enables a global object count of the one or more objects in the image to be determined.

5. The system of claim 1, wherein the ILC training procedure enables the trained neural network architecture to compute object counts for object categories that exceed the pre-determined subitizing range.

6. The system of claim 1, wherein training the neural network architecture includes generating pseudo ground-truth masks that are utilized to train the neural network architecture to generate the one or more density maps.

7. The system of claim 1, wherein, based on the object counting and instance segmentation performed on the image, analysis information corresponding to the image is generated.

8. The system of claim 7, wherein the analysis information indicates a global count of the one or more objects in the image and identifies locations of the one or more objects on a pixel-level basis.

9. The system of claim 1, wherein:
performing object counting includes determining a global count of the one or more objects on a per-category basis; and
performing instance segmentation includes identifying one or more locations of the one or more objects in the image.

10. A method comprising:
training a neural network architecture with a loss function to perform object counting and instance segmentation using an image-level supervised training procedure that utilizes training images annotated with ground-truth object count information to train the neural network architecture to generate one or more density maps corresponding to one or more object categories, wherein:
the image-level supervised training procedure comprises an image-level lower count (ILC) training procedure that trains the neural network architecture using the training images; and
for each one of the training images, the ground-truth object count information specifies object counts for each object category having an object count within a pre-determined subitizing range, and the ground-truth object count information does not specify the object counts for any object category having an object count exceeding the pre-determined subitizing range;
receive, at the trained neural network architecture, an image comprising one or more objects;
generate, using the trained neural network architecture, a density map corresponding to the image; and
perform object counting and instance segmentation on the image, at least in part, using the density map generated by the trained neural network architecture.

11. The method of claim 10, wherein the trained neural network architecture comprises:
an image classification branch that is trained to determine a presence or absence of the one or more objects in the image; and
a density branch that is trained to count the one or more objects in the image and to identify locations of the one or more objects in the image using the density map.

12. The method of claim 10, wherein the loss function at least includes:
a spatial loss term that is used, at least in part, to train a density branch of the neural network architecture to generate the density map in a manner that enables the density map to preserve a spatial distribution of the one or more objects in the image.

13. The method of claim 12, wherein the loss function further includes:
a global loss term that is used, at least in part, to train the density branch of the neural network architecture to generate the density map in a manner that enables a global object count of the one or more objects in the image to be determined.

14. The method of claim 10, wherein the ILC training procedure enables the trained neural network architecture to compute object counts for object categories that exceed the pre-determined subitizing range.

15. The method of claim 10, wherein training the neural network architecture includes generating pseudo ground-truth masks that are utilized to train the neural network architecture to generate the one or more density maps.

16. The method of claim 10, wherein, based on the object counting and instance segmentation performed on the image, analysis information corresponding to the image is generated.

17. The method of claim 16, wherein the analysis information indicates a global count of the one or more objects in the image and identifies locations of the one or more objects on a pixel-level basis.

18. A computer program product comprising a non-transitory computer-readable medium including instructions for causing a computer to:
train a neural network architecture with a loss function to perform object counting and instance segmentation using an image-level supervised training procedure that utilizes training images annotated with ground-truth object count information to train the neural network architecture to generate one or more density maps corresponding to one or more object categories, wherein:
the image-level supervised training procedure comprises an image-level lower count (ILC) training procedure that trains the neural network architecture using the training images; and
for each training image, the ground-truth object count information specifies object counts for each object category having an object count within a pre-determined subitizing range, and the ground-truth object count information does not specify the object counts for any object category having an object count exceeding the pre-determined subitizing range;
receive, at the trained neural network architecture, an image comprising one or more objects;
generate, using the trained neural network architecture, a density map corresponding to the image; and
perform object counting and instance segmentation on the image, at least in part, using the density map generated by the trained neural network architecture.

19. A system comprising:
one or more computing devices comprising one or more processors and one or more non-transitory storage devices for storing instructions, wherein execution of the instructions by the one or more processors causes the one or more computing devices to:
train a neural network architecture with a loss function to perform object counting and instance segmentation using an image-level supervised training procedure that utilizes training images annotated with ground-truth object count information to train the neural network architecture to generate one or more density maps corresponding to one or more object categories, wherein training the neural network architecture includes generating pseudo ground-truth masks that are utilized to train the neural network architecture to generate the one or more density maps;

receive, at the trained neural network architecture, an image comprising one or more objects;

generate, using the trained neural network architecture, a density map corresponding to the image; and perform object counting and instance segmentation on the image, at least in part, using the density map generated by the trained neural network architecture.

20. A method comprising:

training a neural network architecture with a loss function to perform object counting and instance segmentation using an image-level supervised training procedure that utilizes training images annotated with ground-truth object count information to train the neural network architecture to generate one or more density maps corresponding to one or more object categories, wherein training the neural network architecture includes generating pseudo ground-truth masks that are utilized to train the neural network architecture to generate the one or more density maps;

receive, at the trained neural network architecture, an image comprising one or more objects;

generate, using the trained neural network architecture, a density map corresponding to the image; and perform object counting and instance segmentation on the image, at least in part, using the density map generated by the trained neural network architecture.

21. A computer program product comprising a non-transitory computer-readable medium including instructions for causing a computer to:

train a neural network architecture with a loss function to perform object counting and instance segmentation using an image-level supervised training procedure that utilizes training images annotated with ground-truth object count information to train the neural network architecture to generate one or more density maps corresponding to one or more object categories, wherein training the neural network architecture includes generating pseudo ground-truth masks that are utilized to train the neural network architecture to generate the one or more density maps;

receive, at the trained neural network architecture, an image comprising one or more objects;

generate, using the trained neural network architecture, a density map corresponding to the image; and perform object counting and instance segmentation on the image, at least in part, using the density map generated by the trained neural network architecture.

* * * * *